Oct. 26, 1954
N. S. REYNOLDS
2,692,785
SEAL
Filed Jan. 26, 1949
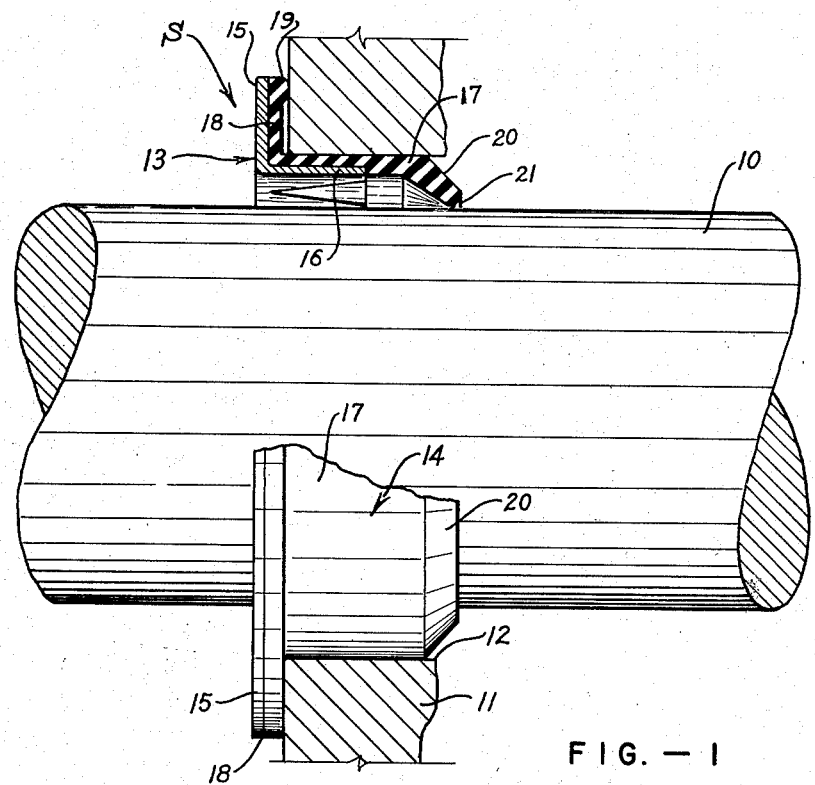
FIG. — 1
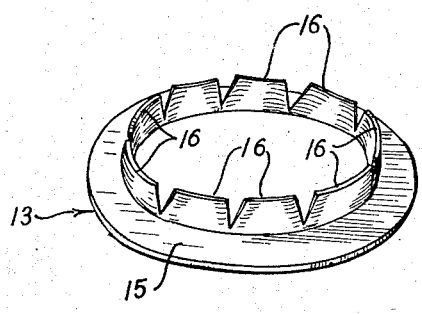
FIG. — 2
*INVENTOR.*
Noel S. Reynolds
BY
*Lamphere and Van Valkenburgh*
ATTORNEYS Patented Oct. 26, 1954

2,692,785

UNITED STATES PATENT OFFICE 2,692,785

SEAL

Noel S. Reynolds, St. Louis, Mo., assignor to National Motor Bearing Co., Inc., Redwood City, Calif., a corporation of California Application January 26, 1949, Serial No. 72,946

7 Claims. (Cl. 288—2)

This invention relates to seals and more particularly to an improved seal for association with relatively rotatable members.

One of the objects of the invention is to provide a seal of the kind referred to that is simple in construction, cheap to manufacture, easy to install and efficient in operation.

Another object is to produce a seal of moldable material such as rubber or synthetic rubber and associate therewith improved shell means for maintaining the seal fixed with respect to one of the two relatively rotatable members with which the seal is to be used.

Yet another object is to embody in a seal improved tension means to maintain the seal in non-rotative relation with a member with which it is to be associated.

A further object is to so construct a seal that it will be efficiently held in bores of housings or like members, notwithstanding the bores may vary somewhat in diameter, due to large tolerances permitted in manufacture.

A still further object is to produce an improved seal in which a sealing lip structure is molded on a supporting and mounting shell.

A more specific object is to so construct and embody in a seal of flexible moldable material a supporting and mounting shell which will function independently of yielding of the moldable material to hold the seal in operative position by a yieldable pressure action.

Yet a further object is to produce an improved shell structure for a seal of moldable material which will embody holding spring fingers to which the moldable material can be attached.

Other objects of the invention will become apparent from the following description taken in connection with the accompanying drawings:

Figure 1 is a side view of a seal shown, by way of example, as embodying my invention, said seal being shown in an operative position with a shaft and housing member with parts in section to disclose details; and Figure 2 is a perspective view of the metal shell.

Referring to the drawing in detail, my improved seal S, as shown, is specially adapted for association with a shaft 10 and a surrounding housing member 11 having a cylindrical bore 12 in spaced relation to the shaft. The shaft may be an axle or the like and the housing may be part of a casing or a part of some other structure.

The seal comprises two members, a supporting and mounting shell 13 of metal or like rigid material, and a structure 14 made of moldable yieldable material such as rubber, synthetic rubber, or like material which will have the desired characteristics of flexibility, yieldability, wear and resistance to damage from fluids and temperature changes which exist where the seal is to be used.

The shell 13 is formed to have a radially extending annular flange portion 15 and axially extending fingers 16 integral with the flange portion at the inner edge. The metal material from which the shell is to be made will be such that the fingers are capable of being flexed with respect to the flange and when flexed from their normal position will have a spring action. Thus, if the fingers are flexed radially inwardly, they will tend to spring back to their normal axially extending position. The shell is preferably made from a single flat piece of metal which is blanked so as to produce the flange and the fingers by radial slits, with all portions lying in a single plane. With this structure the shell is then shaped so the fingers will extend axially, all as shown in Figure 2.

The structure 14 of the seal which is to be made of a moldable yieldable material has a cylindrical portion 17, a part of which overlies the fingers 16 and another part of which extends beyond the free ends of the fingers. The portion overlying the fingers is relatively thin and also of less thickness than the other extending part. The structure 14 also includes a radially extending portion 18 which is co-extensive with the flange portion 15 of the shell, said portion 18 being on the inside of the flange portion. This portion 18 is also relatively thin and is formed with a bead 19 adjacent its periphery and is for engagement with the side surface of the housing 11 when the seal is in operative position as shown in Figure 1.

The structure 14 also has a portion 20 at the outer end of the cylindrical portion 17. This portion 20 is of frusto-conical shape so as to have an end of reduced diameter, at which is a sealing lip 21 for engagement with the surface of the shaft 10 when the seal is in operative position. The diameter of the edge of the lip will be slightly less than the diameter of the shaft so there will be a sealing engagement. The outer and inner surfaces of the frusto-conical portion 20 are formed so as to converge toward the lip end, thus making the lip end somewhat more flexible than that portion which is integral with the cylindrical portion 17. This will permit the lip end to flex readily and thereby maintain sealing action with the shaft, notwithstanding there may be slight ecccentric movement of the shaft with the bore of the housing as the shaft rotates.

The structure 14 of moldable material may be molded separately from the shell and then attached thereto by suitable cement. However, the preferred method in making the seal is to mold the structure 14 directly on the shell and thus have it bonded thereto. When so molded, the moldable material of the cylindrical portion 17 will not only overlie the fingers, but will also fill the space between edges of adjacent fingers. Such will insure a stronger union between shell and moldable material.

In constructing the seal, the fingers 16 and the cylindrical portion 17 of moldable material will have such normal relationship that the diameter of the outer surface of the cylindrical portion will be slightly greater than the diameter of the bore 12 in the housing 11. This greater diameter will be sufficient to take care of all tolerances allowed in producing the bore, which may be quite large insofar as manufacturing tolerances are concerned. With the fingers backing up the cylindrical portion and the outer surface of the cylindrical portion being slightly oversize with respect to the bore which is to receive it, then when the seal is mounted the fingers will be flexed inwardly as the seal is forced into the bore and this finger flexing will place the fingers under tension so they will apply an outward radial pressure on the cylindrical portion 17. The seal will thus be firmly held in the bore and this holding will be solely by spring action. The pressure engagement of the seal with the bore will prevent any leakage between the bore and seal. Furthermore, when the seal is inserted it will be pushed into the bore to the fullest extent possible and when this is done the bead 19 on the molded structure will be brought into engagement with the housing, thus giving additional sealing action between the seal and the housing. The bead will be held engaged with the housing by the backing provided from the rigid flange portion 15 of the shell.

I am aware that seals have been constructed to be held in bores by providing a cylindrical portion of rubber or like material and a continuous backing ring of rigid material. The principle involved in the holding of such seals in the bore is so-called "compression" of the rubber. The outer diameter of the cylindrical portion of the rubber is made oversized with respect to the bore, and when the seal is mounted the rubber will be "compressed" between the bore surface and the continuous back-up ring. No flexing of the back-up ring is permitted, due to its rigidity and continuous structure. Such seal constructions have disadvantages as to efficient holding of the seal in operative position. Among these disadvantages is the inability to obtain good holding action on bores having various sizes due to wide tolerances and considerable irregularities, and also inadequate holding after a period of time due to the rubber taking a "set" and losing its holding "compression" action.

These disadvantages are not present in the improved seal embodying my invention which operates on a different holding principle. Holding action is not accomplished by "compression" of the rubber or like material. The rubber between the fingers and the bore is thin. Holding action is accomplished solely by the spring action of the fingers. In this way "set" of the rubber will have no effect on the holding action. Also, the flexible fingers will insure that the seal will always be held efficiently, notwithstanding relatively large tolerances allowed for the bore diameters which may be as high as .015 or .020 inches. The fingers are flexed inwardly when the seal is mounted and the tension thereby created will always insure a holding pressure on the cylindrical portion of the seal. Sealing action is also better on any irregular surfaces of the bore.

Although a specific seal construction has been disclosed to illustrate my invention, it is to be understood that various modifications can be made without departing from the fundamental principles thereof. For example, in certain seals the flange of the shell may extend radially inwardly from the fingers. Also, the seal can be made so that the seal will be held on the shaft by the spring finger action of the shell and the sealing lip will then cooperate with the bore surface. Also, the seal can be arranged to be used where a shaft is stationary and the housing rotates. Therefore, being aware of modifications, it is intended that the scope of the invention is not to be limited in any manner except in accordance with the appended claims.

What is claimed is:

1. A seal adapted for use between a member having a bore and a shaft extending therethrough, said seal comprising a shell having a radially extending flange and axially extending split fingers integral with the inner portion of the flange and capable of spring action when flexed radially inwardly, an annular structure of moldable yieldable material carried by the shell, said structure having a cylindrical portion of a thickness substantially less than its axial dimension and the structure being so associated with the shell that the fingers are positioned beneath its outer surface, an outwardly extending integral portion co-extensive with the shell flange and an annular integral portion extending to a reduced diameter and provided with a sealing lip for shaft engagement, the outer diameter of the cylindrical portion being normally of slightly greater diameter than the bore and capable of being received in the bore by flexing of the fingers radially inward and the extent of reception being such as to bring the outwardly extending portion of the moldable material which is co-extensive with the shell flange into engagement with the surface of the member at the end of the bore and the flange of the shell extending outwardly beyond the outer surface of the cylindrical portion of the moldable structure a substantial distance.

2. A seal adapted for use between a member having a bore and a shaft extending therethrough, said seal comprising a shell having an outwardly extending flange and integral spring fingers extending axially from the inner portion of the flange, and moldable material attached to the shell, said moldable material having a portion co-extensive with the flange and provided with an annular bead, a second integral portion overlying the spring fingers for reception in the member having the bore and a third integral portion extending to a reduced diameter and provided with a sealing lip for engaging the shaft.

3. A seal made from a structure of moldable yieldable material and a metal supporting and mounting shell, said structure of moldable material comprising a cylindrical portion, an annular frustro-conical sleeve portion extending therefrom with its end of smaller diameter remote from the cylindrical portion and being provided with a sealing lip and said shell comprising an annular flange extending in a radial direction outwardly a substantial distance beyond the external surface of the cylindrical portion and integral spring fingers extending in an axial direction and being secured to the cylindrical portion of moldable material beneath its outer surface so as to establish outward radial spring action forces on the outer surface of said cylindrical portion when the fingers are flexed inwardly by the cylindrical portion being placed in a bore having a slightly smaller diameter, said cylindrical portion having a thickness substantially less than its axial dimension and its axial dimension being greater than the length of the fingers.

4. A seal adapted for use between two relatively rotatable members having spaced concentric cylindrical surfaces, said seal comprising an annular structure made of moldable yieldable material having a cylindrical portion of a thickness substantially less than its axial dimension for engaging the cylindrical surface of one of the members and another integral annular portion extending from one end of the cylindrical portion to a different diameter and being provided with a sealing lip for engaging the cylindrical surface of the other of the relatively rotatable members, and a supporting and mounting shell comprising an annular flange portion lying in a plane at right angles to the axis of the cylindrical portion and a plurality of split spring fingers integrally extending from the flange in the axial direction, said fingers having the cylindrical portion of the annular structure of moldable material molded thereto and arranged to be positioned beneath the surface thereof which is to engage the cylindrical surface of said one relatively rotatable member and said fingers and cylindrical portion being so normally constructed that when the seal is in operative position the fingers can be flexed so as to have a spring action applying force to cause the cylindrical portion of the moldable structure to have continuous pressure engagement with the said cylindrical surface of the one relatively rotatable member, said radial flange extending beyond the engaged cylindrical surface, and the fingers being free of the annular portion carrying the sealing lip.

5. A seal for use between a member having a cylindrical bore and a shaft extending therethrough, said seal comprising a metal shell having integral axially extending circumferentially arranged split fingers capable of spring action when flexed radially inwardly, an annular structure of moldable yieldable material molded on the shell so as to provide sealing material circumferentially fixed to and overlying the fingers and establishing a continuous cylindrical surface with the diameter thereof being normally slightly greater than the said bore of the member with which the seal is to be used so the seal can be mounted in the bore by inward flexing of the fingers and the continuous cylindrical surface formed by the molded yieldable material held in pressure engagement therewith by spring action of the fingers, and an annular integral portion of moldable yieldable material carried by the seal and constructed to extend from one end thereof in a general axial direction beyond the fingers and being provided at its end with a sealing lip of smaller diameter than the annular structure molded on the fingers and engageable with the shaft when the seal is mounted in the bore, said sealing lip having such position beyond the fingers as in no way to be effected thereby in its engaging pressure with the shaft.

6. A seal adapted for use between a member having a bore and a shaft extending therethrough, said seal comprising a shell having an outwardly extending flange which will be substantially at right angles to the axis of the bore and shaft and an axially extending integral structure for extending into the bore, and moldable flexible material attached to the shell, said moldable material having a portion co-extensive with the flange and provided with an annular bead on its external surface for engaging a surface of the member having the bore which surface is substantially at right angles to the bore axis, and another molded portion having a part overlying the axially extending structure on that side toward the bore when the seal is operative and being provided with a sealing lip of smaller diameter than the axially extending structure for engaging the shaft in a free flexing condition.

7. A seal for use between a member having a cylindrical bore and a shaft extending therethrough and being of a diameter substantially less than that of the bore, said seal comprising a metal shell having a radially extending part defining a flat annular structure and an axial part extending from the inner marginal portion of the radially extending part and being of less diameter than the bore and greater than the shaft, and rubber material molded as an integral structure on the shell, said rubber material covering the complete surface of the radially extending part which is on that side from which extends the axial part, and said rubber material also covering the outer part of the axially extending part of the shell and having an outer diameter slightly greater than the diameter of the bore in which it is to be received, and additional integral rubber material of annular form extending beyond the axial part of the shell and in a general direction toward the axis of the shell and being provided at its free end with a shaft sealing lip having a lip edge of a diameter slightly less than the shaft diameter, the outer surface of the extending annular rubber material being so formed from a point outwardly of the axial part of the shell to the lip edge that a diameter thereof at any cross section taken at right angles to the seal axis is not less than any diameter at a like cross section taken closer to the lip edge and the inner surface of the extending annular rubber material of said extending annular material also being so formed from a point outwardly of the axial part of the shell to the lip edge that right angular cross sectional diameters thereof will be related in the same manner as those of the outer surface, said lip edge having such distance from the axial part of the shell that its pressure engagement with the shaft will be uneffected thereby.

References Cited in the file of this patent

UNITED STATES PATENTS

| Number | Name | Date |
| --- | --- | --- |
| 1,963,465 | Johnson | June 19, 1934 |
| 2,088,703 | Hubbard et al. | Aug. 3, 1937 |
| 2,208,482 | Victor | July 16, 1940 |
| 2,434,484 | Chambers | Jan. 13, 1948 |

FOREIGN PATENTS

| Number | Country | Date |
| --- | --- | --- |
| 578,526 | Great Britain | of 1946 |